Patented Aug. 16, 1938

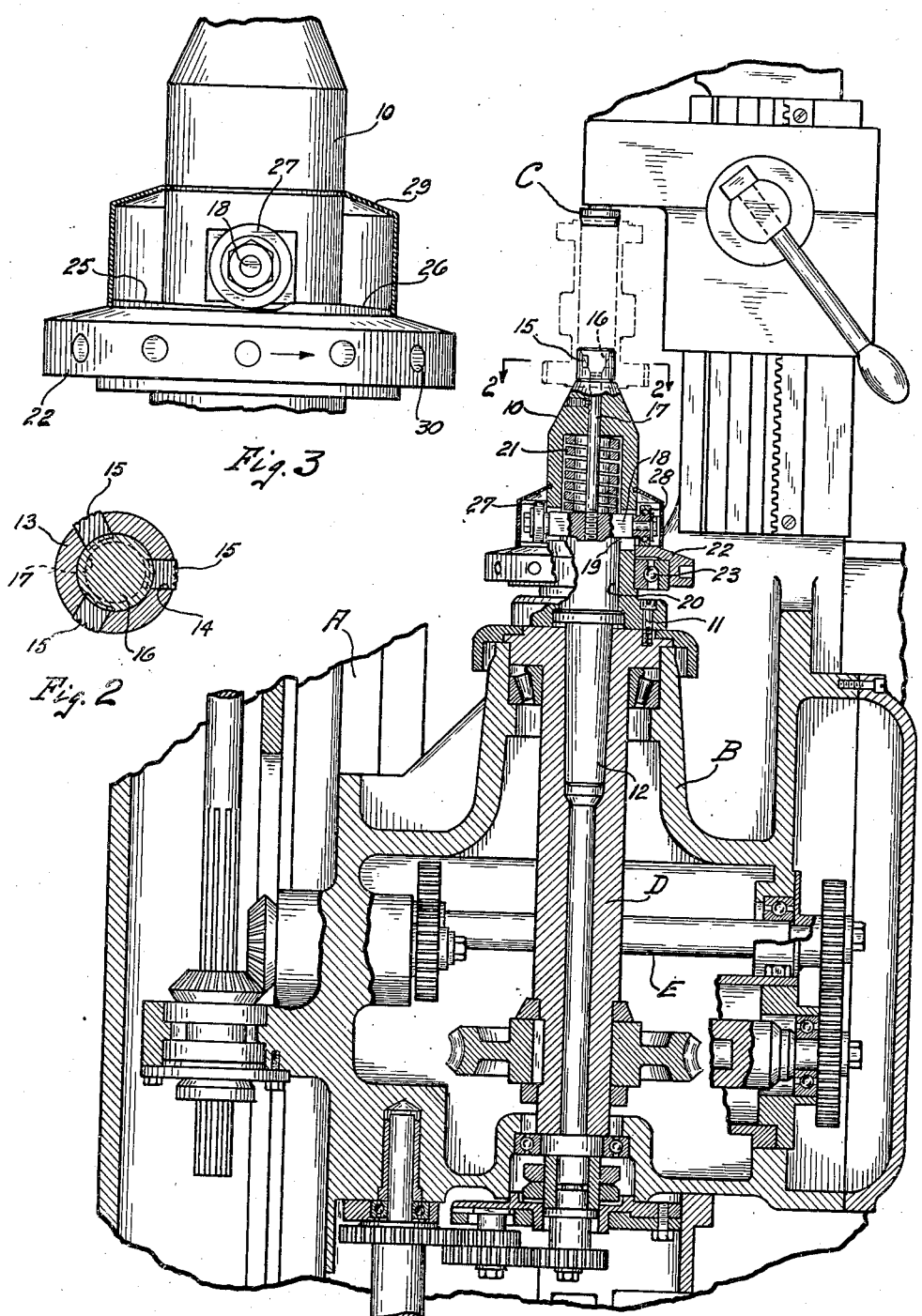

2,127,273

UNITED STATES PATENT OFFICE 2,127,273

HOBBING MACHINE

Otis E. Staples, Cleveland, Ohio, assignor to The Cleveland Hobbing Machine Company, Cleveland, Ohio, a corporation of Ohio Application February 6, 1937, Serial No. 124,440

2 Claims. (Cl. 279—2)

The present invention relates to metal working machines and more particularly to a mechanical chuck especially adapted for use with hobbing machines of the multiple unit rotary turret type such as shown and described in U. S. patent to Frank H. Adams et al., No. 2,048,173.

Prior to the present invention considerable difficulty has been encountered in holding certain pieces of work, especially those which must be held and driven solely from the inside thereof, in machines of the type referred to. The prior art devices available for this purpose either do not exert sufficient force to satisfactorily hold the work blank against slipping during the cutting operation or are too cumbersome or too difficult to operate in the space and time determined by satisfactory present day mass production requirements. Fluid pressure, such as air, operated chucks which have the necessary requirements of being capable of exerting immense force and at the same time being relatively operated to engage and disengage the work, do not operate satisfactorily on the aforesaid machines because of the difficulty of obtaining an unfaltering supply of air at the chucks due to the rotation of the turret. Electrically operated chucks are subject to similar objections.

With the foregoing in mind an object of the present invention is the provision of a novel and improved mechanical chuck as distinguished from a fluid pressure or electrically actuated one, which will securely hold a work blank, and which can be readily and easily actuated to engage or release the work as required.

Another object of the present invention is the provision of a novel and improved mechanical chuck comprising a heavy spring for causing the chuck to engage a work piece and a readily accessible and easily actuated cam for releasing the work against the action of the spring.

The present invention resides in certain novel details of construction, combinations and arrangements of parts, and further objects and advantages thereof will be apparent from the following description of the preferred embodiment thereof, described with reference to the accompanying drawing forming a part of this specification, in which similar reference characters designate corresponding parts, and in which:

Fig. 1 is a section through a work spindle of one of the hobbing units of a multiple unit hobbing machine similar to that shown in the aforesaid patent but provided with chucks embodying the present invention.

Fig. 2 is a section on the line 2—2 of Fig. 1.

Fig. 3 is a side view of the chuck shown in Fig. 1 with a part of the bearing shield broken away to show the rollers and cam inside thereof.

As previously stated the present invention is especially applicable to multiple unit rotary hobbing machines and is herein shown and described as applied to such a machine. The machine per se forms no part of the present invention and is not entirely shown in the drawing or herein described in detail.

For the purpose of the present invention it is sufficient to say that the machine is fully illustrated and described in the aforesaid patent to Frank H. Adams et al. to which reference is made for a complete description of the machine. In the present drawing the turret is designated generally by the reference character A, the work head by the reference character B, the tail stop by the reference character C, the work spindle by the reference character D, and the driving mechanism for the work spindle and the feed movement of the work head by the reference character E.

The chuck shown comprises a body member or work arbor 10 fixed to the upper end of the work spindle in any suitable manner as by the bolts 11, and a centering member or plug 12, the lower tapered end of which projects into the work spindle while the head thereof extends above the spindle and fits into a counterbore in the lower end of the work arbor. The plug 12 is used primarily to center the chuck with respect to the axis of rotation of the spindle D. The upper reduced end 13 of the work arbor 10 is provided with a plurality of radial slots 14 in which work-engaging jaws 15 are slidably supported for movement radially of the axis of the longitudinal work arbor and the axis of rotation of the spindle. The work-engaging jaws 15 are adapted to be expanded, or in other words projected from the work arbor or body member 10 by a tapered head 16 formed on the upper end of a pull rod 17 projecting downwardly through the center of the work arbor. The lower end of the pull rod 17 is connected to a transverse bearing shaft 18 which extends through elongated apertures 19 in the work arbor or body member 10 and projects to opposite sides thereof.

The bearing shaft 18 extends across a counterbore 20 in the lower end of the body member 10 and is continuously urged in a downwardly direction by a heavy compression spring 21 located in the counterbore 20 and interposed between the bottom thereof and the bearing shaft 18. The spring 21 is a very heavy spring, preferably a 1500 pound spring, and the bearing shaft 18 is adapted to be raised against the force thereof to release the work by a cam member 22 rotatably supported through the medium of anti-friction bearings 23 about the lower end of the work arbor 10. The upper surface of the cam member is provided with two suitably inclined face cam tracks 25 and 26 adapted to be engaged by rollers 27 carried on opposite ends of the bearing shaft 18. Anti-friction bearings 28 interposed between the rollers and the bearing shaft 18 reduce the friction to a minimum. The construction is such that when the cam member 22 is in such a position that the rollers are above the lowest part of the cam tracks 25 and 26, they do not engage the same, therefore allowing the full force of the spring 20 to be exerted against the bearing shaft 18, and in turn utilized in gripping the work. It will be apparent that the cam member 22 can be readily and easily rotated in the direction indicated by the arrow shown in Fig. 2, to raise the bearing shaft 18 against the action of the spring 20, to release the work. The rollers 26 etc. are enclosed in a bearing shield 29 which prevents chips, etc. from interfering with the proper operation thereof, and which also serves as a guard for the operator.

It is believed that the operation of the device will be apparent from the foregoing description thereof. Suffice it to say that the cam member 22 can be readily rotated or oscillated to chuck or unchuck a work blank. In the preferred embodiment shown the periphery of the cam member 22 is provided with a plurality of holes 30 into which a bar or tool may be inserted to facilitate rotation of the cam, but in practice this has been found unnecessary. While the preferred embodiment of the invention has been shown and described in considerable detail, it will be apparent that the invention is susceptible of various modifications and alternative constructions, and is not limited to the specific construction shown.

Having described the invention, what I claim is:

1. An expandible chuck comprising a body member adapted to be connected to a rotatable spindle, a plurality of work engaging jaws carried by said body portion and movable radially of the longitudinal axis thereof, a transverse member extending through said body portion and movable longitudinally thereof, a longitudinally extending member connected to said transverse member and provided with a cam surface adjacent said work engaging jaws adapted to move the latter into expanded position, rollers carried by said transverse member, a spring located within said body member and operatively connected thereto and to said transverse member for continuously urging said longitudinal member in a direction to move said jaws into expanded position, a cam member rotatably supported about the exterior of said body member and having a plurality of cam surfaces on the face thereof adapted to engage said rollers and move said transverse or cross member against the action of said spring, and antifriction bearings interposed between said body member and said cam member.

2. An expandible chuck comprising a body member having a counterbore in one end thereof, work engaging members carried by said body member and movable radially of the longitudinal axis thereof, a transverse member extending through said body member and across said counterbore and movable longitudinally thereof, a longitudinally extending member connected to said transverse member and provided with a cam surface adapted to move said work engaging member radially, a heavy spring in said counterbore in said body member and interposed between the bottom thereof and said transverse member for continuously urging the latter in a direction to move said work engaging members into expanded position, rollers carried by said transverse member adjacent opposite ends thereof, a cam member rotatably supported about said body member and having a plurality of cam surfaces thereon adapted to engage said rollers and move said transverse or cross member against the action of said spring, and antifriction bearings interposed between said body member and said cam member.

OTIS E. STAPLES.